A. H. VAN PELT.
ELECTRIC WATER PURIFIER AND FILTER.
APPLICATION FILED AUG. 9, 1911.
1,020,001. Patented Mar. 12, 1912.
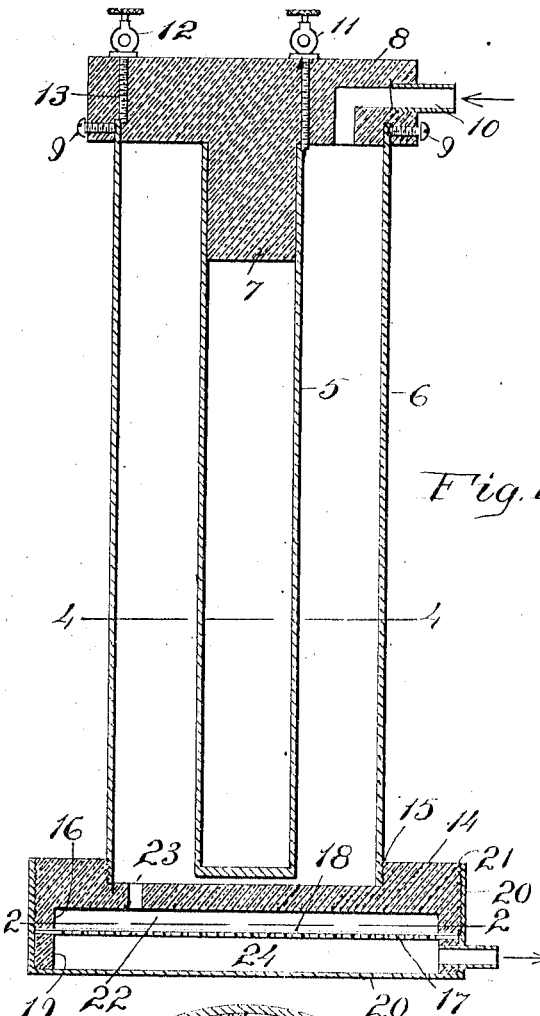
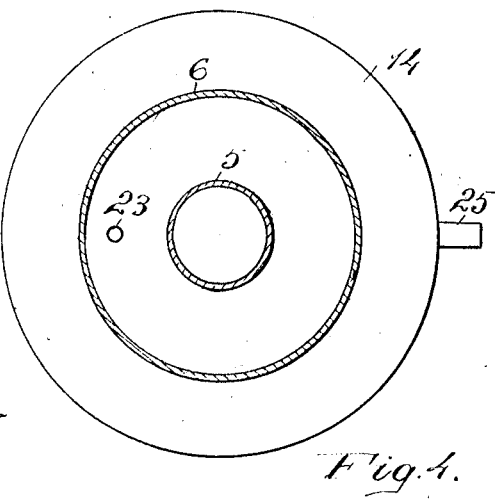
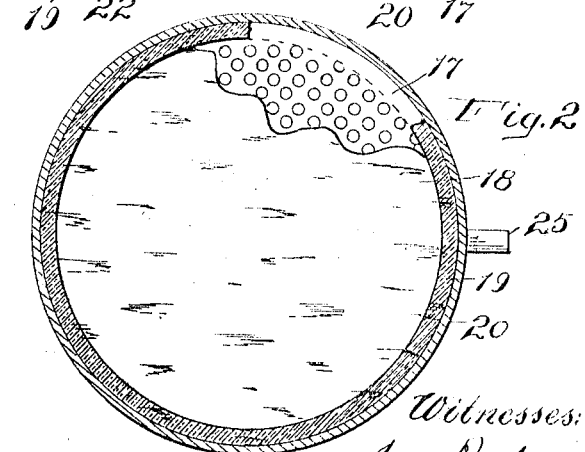
Witnesses:
Aug Roehm
H. D. Hanson
Inventor:
A. H. Van Pelt
By ........ Atty

UNITED STATES PATENT OFFICE.

ADA HENRY VAN PELT, OF LOS ANGELES, CALIFORNIA.

ELECTRIC WATER PURIFIER AND FILTER.

1,020,001.  Specification of Letters Patent.  Patented Mar. 12, 1912.

Application filed August 9, 1911. Serial No. 643,214.

*To all whom it may concern:*

Be it known that I, ADA HENRY VAN PELT, a citizen of the United States, and resident of Los Angeles, in the county of Los Angeles and State of California, have invented certain new and useful Improvements in Electric Water Purifiers and Filters, of which the following is a specification.

My invention pertains to water purifiers, and it has special reference to purification by electrolysis.

My object is to provide a small, portable apparatus, which may be readily attached to an electric socket, and which has, also, a filter connected therewith, so that the operation of purifying and filtering may be accomplished in a single apparatus.

The invention comprises a pair of tubular electrodes provided with a head, which carries the electric terminals, and has the water supply inlet, and a base which is hollow, and contains a reticulated plate over which the filtering paper of material is placed, and below the reticulated plate is a discharge outlet for the water. The base is so made that it may be readily removed from the tubular electrodes, and also separated so that the interior may be cleansed and new filtering material supplied, all of which will now be set forth in detail.

In the drawing, Figure 1 is a central, vertical section of the purifying apparatus. Fig. 2 is a horizontal section on line 2—2 of Fig. 1. Fig. 3 is a top view of the cap, and Fig. 4 is a horizontal section on line 4—4 of Fig. 1.

In constructing my invention I provide an inner and an outer tube 5, 6, respectively, of aluminium, the inner tube 5, being secured to a downwardly-projecting boss 7, which is integral with the cap 8, and the upper end of the outer tube 6 is secured to an annular channel in the cap, and held by means of screws 9, or in any other suitable manner. A water inlet 10 is provided at one side through this cap, and I also provide a pair of binding posts 11, 12, the threaded stems 13 of which go into the cap and contact with the ends of the respective electrodes 5, 6. The lower end of the inner electrode 5, is preferably closed, as shown, and the entire electrode is supported, as shown by the boss 7. The lower end of the outer electrode is threaded, so that it may be screwed into the base member 14, as shown at 15. This base member 14 has on its lower side an annular flange 16, and below this flange is a reticulated disk 17, over which is laid filter paper, 18, or other suitable filtering material. A ring 19 of the same diameter as the flange 17, is placed in the base of the metal shell 20, and below the reticulated plate 17, so that when the shell 21 is screwed up the plate and filter material are held between the flange 17, and ring 19. The shell 20 and edge of the base member 14, are threaded, as at 21, so as to hold the plate and filter material in place. It will thus be seen that two chambers are formed in the base, the upper chamber 22 being designed to receive the electrolytically-treated water through the port 23, as it is discharged from the electrical chamber, and the lower chamber 24, which receives the purified and filtered water, and the water thus treated is discharged through the pipe 25. As thus constructed there are many features of advantage, particularly in regard to cheapness of construction, and in the simplicity of arrangement, whereby both the electrodes and the filter can be readily exposed for cleaning purposes.

The operation is as follows: Current is supplied to the electrodes 5, 6 in the usual manner, and water is permitted to flow into the inlet pipe 10, and after treatment it escapes from the electrode chamber to the compartment 22, through the port 23, and passes thence through the filter body 18, to the lower chamber 24, and discharge pipe 25. For cleaning the filter the shell 20 is removed, and for cleaning the electrodes the base member 14 is unscrewed. In case of renewals the electrodes may be detached from the cap at the upper end.

What I claim as new, is:—

In a combined electrolytic purifier and filter, a pair of electrodes, a filtering chamber below the electrodes, comprising a base member adjustably secured to the lower end of one of the electrodes, a shell surrounding said base member, and removably attached to said base member, a filter within the said chamber, and an inlet and outlet for said chamber.

Signed at Los Angeles, in the county of Los Angeles, and State of California, this 24th day of May, A. D. 1911.

ADA HENRY VAN PELT.

Witnesses:
JACQUEMENOT M. MINDERHOUT,
J. S. ZERBE.